United States Patent [19]
Lauzon et al.

[11] Patent Number: 6,105,850
[45] Date of Patent: Aug. 22, 2000

[54] ALUMINUM BRAZING METHOD WHICH AVOIDS WASTE WATER

[75] Inventors: Daniel Clement Lauzon; Thomas Schwarze, both of Hannover, Germany

[73] Assignee: Solvay Fluor und Derivate GmbH, Hannover, Germany

[21] Appl. No.: 09/186,660

[22] Filed: Nov. 6, 1998

[30] Foreign Application Priority Data

Nov. 6, 1997 [DE] Germany ............................ 197 49 042

[51] Int. Cl.$^7$ ................................ C23C 2/12; B23K 1/20
[52] U.S. Cl. ....................... 228/207; 228/223; 228/262.51
[58] Field of Search .................................. 228/214, 223, 228/262.51, 207; 134/10, 13; 427/229, 422, 5.5, 118

[56] References Cited

U.S. PATENT DOCUMENTS

| | | |
|---|---|---|
| 3,769,099 | 10/1973 | De Long . |
| 3,971,501 | 7/1976 | Cooke . |
| 4,244,506 | 1/1981 | Stokes, Jr. et al. ............... 228/223 |
| 4,428,920 | 1/1984 | Willenberg . |
| 4,579,605 | 4/1986 | Kawase . |
| 5,318,764 | 6/1994 | Meshri . |
| 5,409,613 | 4/1995 | Weaver . |

FOREIGN PATENT DOCUMENTS

| | | |
|---|---|---|
| 091 231 A1 | 10/1983 | European Pat. Off. . |
| 195 19 515 | 7/1996 | Germany . |
| 195 20 812 | 12/1996 | Germany . |
| 196 36 897 | 3/1998 | Germany . |
| 2050905 | 1/1981 | United Kingdom . |

*Primary Examiner*—Patrick Ryan
*Assistant Examiner*—Jonathan Johnson
*Attorney, Agent, or Firm*—Evenson, McKeown, Edwards & Lenahan, P.L.L.C.

[57] ABSTRACT

A method of avoiding generation of waste water while brazing components made of aluminium or an aluminium alloy using a flux, especially a flux composed of an aqueous suspension of potassium fluoroaluminate. Since used suspension is replaced with fresh suspension after a given period of time and the apparatus regularly have to be cleaned, waste water is produced which contains flux, e.g. potassium fluoroaluminate. In the past, such waste water has been discharged into the environment. It has now been discovered that such waste water can be recycled to the brazing process after separation of the flux. In this manner, the production of waste water can be largely avoided. Since surfactants are frequently used, and these are likewise recirculated, a corresponding saving in terms of surfactant is possible. Furthermore, the environment is protected correspondingly.

11 Claims, 1 Drawing Sheet

ALUMINUM BRAZING METHOD WHICH AVOIDS WASTE WATER

BACKGROUND OF THE INVENTION

The invention relates to a method for soldering or brazing components made of aluminium or aluminium alloys using aqueous flux preparations selected from the group consisting of potassium fluorozincate, cesium fluorozincate, cesium fluoroaluminate, and especially potassium fluoroaluminate, and also mixtures thereof.

It is known to braze together components made of aluminium or aluminium alloys using aqueous preparations of fluxes containing potassium fluoroaluminate. The purpose of the flux is to remove interfering oxide layers on the degreased components, in order to permit satisfactory brazing. To this end, an aqueous preparation of the potassium fluoroaluminate can be used, which is applied to the component or components, for example by spraying, dipping the workpieces into the aqueous preparation, coating the workpieces, etc. The components are then brought into contact at the points which are to be brazed together, and heated. First the water of the suspension evaporates, then the flux melts. Finally, there is formed from braze material or solder, which is either added or produced in situ, a eutectic of solder and aluminium or aluminium alloy which produces the brazed joint. Usually, an excess of the flux preparation is used. Consequently, the excess aqueous preparation of the potassium fluoroaluminate flux is recovered and re-used. This applies, in particular, when the components are applied by spraying. The proportions of flux and water in the recirculated preparation are adjusted to a predetermined value by the addition of flux or water. After a predetermined time, for instance in the evening or after the end of a shift, the spent preparation is not used any further. Instead, a fresh preparation is produced and used. The preparation which is no longer used is a waste water which contains flux and, due to the solubility of the fluorine-containing flux, has a high fluoride content. Such a waste water is also produced if apparatus and operating parts used in the brazing process are cleaned after a predetermined period of time. Such waste water has hitherto been discharged into the environment more or less untreated.

SUMMARY OF THE INVENTION

It is an object of the present invention to provide a more environmentally friendly brazing method.

This object is achieved by providing a method of brazing components made of aluminium or an aluminium alloy, said method comprising the steps of:
  bringing an excess amount of an aqueous flux preparation selected from the group consisting of potassium fluoroaluminate, cesium fluoroaluminate, potassium fluorozincate and cesium fluorozincate into contact with the components to be brazed,
  brazing;
  recovering the excess aqueous flux preparation,
  adding flux or water as needed to adjust the recovered aqueous preparation to a predetermined concentration, and
  recirculating the adjusted excess preparation, whereby flux-containing waste water is produced,
  further comprising separating the waste water from the flux and other solid constituents,
  supplementing the separated waste water with fresh water to form regenerated process water, and
  recycling the regenerated process water to the brazing process.

The method according to the invention for brazing components made of aluminium or aluminium alloys, in which an aqueous preparation of a flux selected from the group consisting of potassium fluoroaluminate, cesium fluoroaluminate, potassium fluorozincate and cesium fluorozincate and mixtures thereof is used; this preparation is brought into contact with the components to be brazed in an excess; the brazing is performed, and the excess aqueous preparation of the flux is recovered and, once the predetermined flux concentration has been set by addition of flux or water, is recirculated, with flux-containing waste water being produced at a predetermined time, provides for the waste water to be separated from the flux and any other solid constituents, to undergo subsequent treatment, to be supplemented with fresh water to form regenerated process water, and for the regenerated process water to be recycled into the brazing process.

In particular, the known potassium fluoroaluminate fluxes composed of compounds comprising potassium, aluminium and fluorine can be used. Fluxes which can be used, and their preparation, are described, for example, in U.S. Pat. Nos. 3,769,099; 4,428,920; 4,579,605, and 5,318,764; and in published German Patent Application Nos. 195 01 937; 195 20 812, and 196 36 897. The latter patent application describes a low-melting $K_2AlF_5$, which is preferably prepared from KOH, aluminium hydroxide and hydrofluoric acid in a molar ratio of K:AL:F of 2:1:5. The flux obtained thereby has a particularly low melting point (in the range from 546 to 550° C.). The flux used may also contain conventional additives such as binders, cesium compounds, solder metal, solder metal precursors or surfactants.

The method according to the invention can also be used when soldering or brazing compounds with cesium fluoroaluminate flux (see U.S. Pat. No. 4,689,092), or brazing with cesium fluorozincate flux and potassium fluorozincate flux (see German Patent application No. DE 198 13 023, published after the priority date of the present application) and mixtures thereof (see e.g. U.S. Pat. No. 4,670,067, which describes potassium-cesium fluoroaluminate fluxes).

The invention will be described in further detail hereinafter with reference to a preferred embodiment, namely, use of the method with a potassium fluoroaluminate flux.

The flux is brought into contact with the components to be brazed, preferably by spraying. In order to accomplish this, aqueous preparations which contain the flux in a concentration of 3 to 70% by weight may be used. The brazing itself is effected in a known manner: the components to be joined are brought to an elevated temperature (for instance in a brazing furnace, by magnetic induction or an open flame)—if desired in an inert gas atmosphere, for example under nitrogen or argon—with the brazed joint forming. For potassium fluoroaluminate fluxes, the temperature is approximately 600° C., and for cesium fluxes it is considerably lower.

For example, the following waste waters which are produced during the brazing process and which contain potassium fluoroaluminate may be treated: spent slurries of potassium fluoroaluminate in water, which are to be replaced by freshly produced slurries; washing water which is produced during the cleaning of components, apparatus, parts of buildings or other articles which have come into contact with the flux slurry or the flux; recovered excess preparation which is not to be used any longer.

Separation of solids may preferably be effected by filter systems and/or in a waste-water tank in which solids are allowed to settle and are then separated, for example by siphons. The subsequent treatment may serve to remove undesirable constituents from the waste water which is obtained once the solids have been separated. This may be an antibacterial treatment, dilution of the slurry, etc. Preferably any suspended solids present and any remaining residual solids particles are separated. This may be effected, for example, in a filter or a centrifuge.

Deionized water is used as fresh water. The regenerated process water advantageously may be stored in a buffer tank. This buffer tank should be sufficiently large to be able to accommodate or store the entire quantity of water which is required over a predetermined period of time.

BRIEF DESCRIPTION OF THE DRAWING

The invention will be explained further with reference to FIG. 1, which is a schematic representation of an apparatus for carrying out the method of the invention.

DETAILED DESCRIPTION OF PREFERRED EMBODIMENTS

Figure 1:
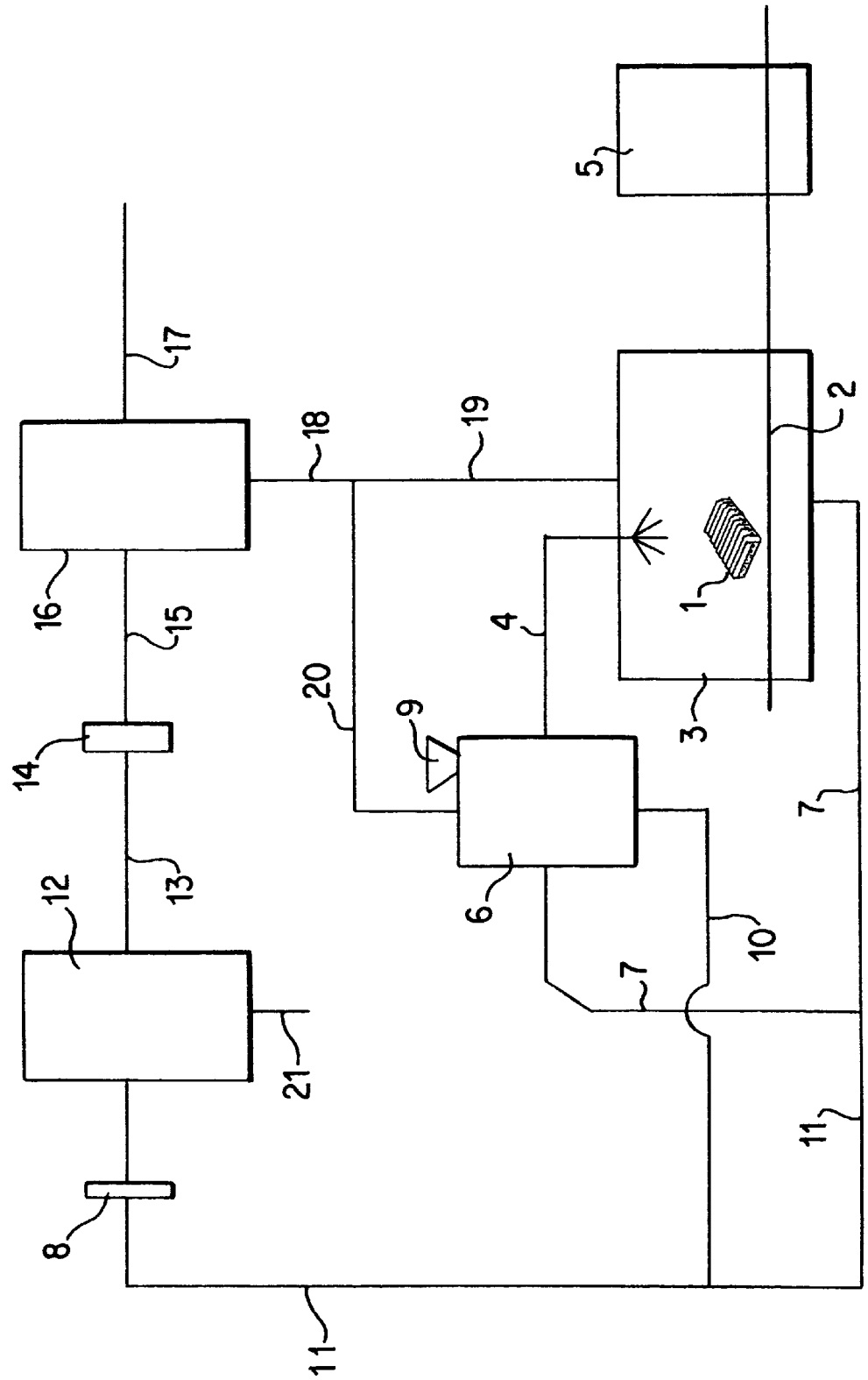

FIG. 1 depicts an installation with which the method according to the invention can be performed.

A heat-exchanger 1, which is composed of degreased aluminium components, is first introduced into the spraying chamber 3 by means of the conveyor belt 2 and is sprayed therein with an aqueous flux preparation which is sprayed into the spraying chamber via line 4. After leaving the spraying chamber 3, the heat-exchanger 1 is introduced into the brazing furnace 5, is heated therein and in so doing is brazed. The brazed heat-exchanger 1 leaves the brazing furnace 5, is then cooled and subjected to further treatment steps, for example quality control, packaging, etc. The flux suspension sprayed in via line 4 is taken from the storage container 6. Excess flux suspension accumulating in the spraying chamber 3 is returned into the storage container 6 via line 7. After a predetermined time, for example at the end of a shift, the flux suspension still present in the storage container 6, which is not to be used in the next shift, is pumped into a settling tank 12 via lines 10 and 11. Solids are allowed to settle in tank 12. The supernatant solution is passed from the settling tank 12 via line 13 through the filter 14, in which suspended solids and any solid constituents present are filtered out. The filtered waste water is passed via line 15 into the buffer tank 16, and is supplemented or made up therein to the desired quantity of regenerated process water with deionized water, which is introduced into the buffer tank 16 via line 17. The regenerated process water is used, via line 18 and lines 19 and 20, to clean the spraying chamber 3 and to prepare fresh flux slurry in the storage container 6. For this purpose, the regenerated process water may be introduced directly into the storage container via line 20.

During the spraying of the components in the spraying chamber 3, naturally a certain quantity of water and a certain quantity of flux will continuously be removed from the recirculated suspension. The recirculated flux preparation is adjusted to the desired concentration of flux in the storage container 6, to which regenerated process water can be supplied via lines 18 and 20, and solid flux via the feed hopper 9.

The quantity of regenerated process water in the buffer tank 16 desirably is calculated such that it corresponds to the water required for a predetermined period of time. If, for example, fresh flux slurry is used for each shift, the quantity of regenerated process water in the buffer tank 16 should be sufficient to be able to clean the spraying chamber 3 (and optionally additional components), to produce fresh flux preparation and to replace the water consumed during brazing.

It is recommended to provide a coarse filter 8 in which coarse particles can be filtered out before they pass into the settling tank 12.

The solids which settle in the settling tank 12 usually still contain a very large amount of water. The water can be separated, for example in a filter press, and likewise can be introduced into the buffer tank 16.

One variant of the invention provides for the tank 12 not to be a settling tank in which solids settle, but a storage tank in which means are provided which prevent the settling of solids. In this variant, all the solids are passed, with the stream of the water to be treated, through the filter 14, to be filtered out therein. A line 21 for removing the settled solids, as is provided in the embodiment as a settling tank, is, of course, unnecessary.

If desired, the swirled slurry can be diluted further in the storage tank 12, for example to a solids content of 2 to 5% by weight.

This variant offers the advantage that all the solids can be removed from the filter 14.

The method according to the invention is distinguished in that no waste water at all is produced. A further advantage is that, if surfactants are contained in the flux preparation, the surfactant is not separated out, but instead is likewise recirculated. This yields a saving in terms of surfactants used, and additional success with regard to environment-friendliness.

The invention also relates to a brazing installation for performing the method. It comprises conventional components such as a means for conveying the material to be brazed into a brazing furnace and for transporting the brazed material out of the brazing furnace, means for applying the aqueous flux preparation to the material to be brazed and a storage tank for flux preparation, and is characterised in that a means for separating solids from the spent flux preparation is provided, this means being connected to the storage tank and the brazing furnace via lines through which the spent flux preparation is passed into the separation means and also a line which permits removal of the water separated from the separation means for the purpose of recycling.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method of brazing components made of aluminium or an aluminium alloy, said method comprising the steps of:

bringing an excess amount of an aqueous flux preparation selected from the group consisting of potassium fluoroaluminate, cesium fluoroaluminate, potassium fluorozincate and cesium fluorozincate into contact with the components to be brazed, brazing the components;

recovering the excess aqueous flux preparation, adding flux or water as needed to adjust the recovered aqueous preparation to a predetermined concentration, and recirculating the adjusted excess preparation, whereby flux-containing waste water is produced, further comprising separating the waste water from the flux and other solid constituents, supplementing the separated waste water with fresh water to form regenerated process water, and recycling the regenerated process water to the brazing process.

2. A method according to claim 1, wherein said flux is a potassium fluoroaluminate flux.

3. A method according to claim 1, further comprising treating the separated waste water to remove suspended solids and any other remaining solids before supplementing with fresh water.

4. A method according to claim 3, wherein the separated waste water is treated by passing the water through a solids filter.

5. A method according to claim 1, wherein the fresh water with which the separated water is supplemented is deionized water.

6. A method according to claim 1, wherein the regenerated process water is used for cleaning apparatus.

7. A method according to claim 1, wherein the regenerated process water is used for adjusting the recovered aqueous preparation to a predetermined concentration.

8. A method according to claim 1, wherein the regenerated process water is used for preparing the aqueous flux preparation by suspending flux in the water.

9. A method according to claim 1, wherein separated waste water is stored in a settling tank.

10. A method according to claim 1, wherein regenerated process water is stored in a buffer tank.

11. A method according to claim 10, wherein a predetermined quantity of regenerated process water is produced in the buffer tank.

* * * * *